United States Patent
Shen

(10) Patent No.: US 9,632,712 B2
(45) Date of Patent: Apr. 25, 2017

(54) SYSTEM AND METHOD OF UPDATING METABLOCKS ASSOCIATED WITH MULTIPLE MEMORY DIES

(71) Applicant: SANDISK TECHNOLOGIES INC., Plano, TX (US)

(72) Inventor: Zhenlei Shen, Milpitas, CA (US)

(73) Assignee: SANDISK TECHNOLOGIES LLC, Plano, TX (US)

(*) Notice: Subject to any disclaimer, the term of this patent is extended or adjusted under 35 U.S.C. 154(b) by 40 days.

(21) Appl. No.: 14/322,781

(22) Filed: Jul. 2, 2014

(65) Prior Publication Data
US 2016/0004464 A1   Jan. 7, 2016

(51) Int. Cl.
*G06F 3/06* (2006.01)
*G06F 12/02* (2006.01)

(52) U.S. Cl.
CPC .......... *G06F 3/0619* (2013.01); *G06F 3/0655* (2013.01); *G06F 3/0688* (2013.01); *G06F 12/0238* (2013.01); *G06F 12/0246* (2013.01); *G06F 3/064* (2013.01); *G06F 3/0626* (2013.01); *G06F 3/0679* (2013.01); *G06F 12/02* (2013.01); *G06F 2212/1016* (2013.01); *G06F 2212/1036* (2013.01); *G06F 2212/7205* (2013.01);
(Continued)

(58) Field of Classification Search
CPC ......... G06F 12/0246; G06F 2212/2022; G06F 2212/7205; G06F 2212/7206; G06F 2212/7207; G06F 2212/7208; G06F 2212/7211; G06F 2212/261; G06F 2212/1036; G06F 3/0649; G06F 3/0616; G06F 3/064; G06F 3/0644; G06F 3/0688
See application file for complete search history.

(56) References Cited

U.S. PATENT DOCUMENTS 9,158,670 B1 * 10/2015 Kang ................ G06F 12/0246
2005/0144357 A1 * 6/2005 Sinclair ............ G06F 12/0246
711/103
(Continued)

OTHER PUBLICATIONS

The International Search Report and the Written Opinion of the International Searching Authority mailed Sep. 17, 2015 in International Application No. PCT/US2015/038606, 11 pages.

*Primary Examiner* — Yaima Rigol
*Assistant Examiner* — Glenn Gossage
(74) *Attorney, Agent, or Firm* — Toler Law Group, PC

(57) ABSTRACT

A method includes, in a data storage device that includes a non-volatile memory having multiple memory dies, determining whether one or more metablocks are metablock update candidates based on relinking metrics corresponding to the one or more metablocks. Each memory die includes multiple blocks of storage elements, and metablocks are formed through linking of blocks from the multiple memory dies. The method also includes comparing a number of the metablock update candidates to a relinking pool threshold. The method further includes, in response to the number of the metablock update candidates satisfying the relinking pool threshold, updating the linking of the blocks of the metablock update candidates to form updated metablocks. Linking of blocks may be updated by changing fields of a metablock data table, and blocks may be grouped based on block health values to extend an average useful life of the updated metablocks.

28 Claims, 4 Drawing Sheets

(52) U.S. Cl.
CPC ........... *G06F 2212/7207* (2013.01); *G06F 2212/7208* (2013.01); *G06F 2212/7211* (2013.01)

(56) References Cited

U.S. PATENT DOCUMENTS

| | | |
|---|---|---|
| 2005/0144516 A1 | 6/2005 | Gonzalez et al. |
| 2008/0052446 A1 | 2/2008 | Lasser et al. |
| 2008/0162612 A1 | 7/2008 | Tomlin et al. |
| 2010/0172179 A1* | 7/2010 | Gorobets ............ G06F 12/0246 365/185.09 |
| 2011/0191530 A1 | 8/2011 | Gonzalez et al. |
| 2012/0047409 A1* | 2/2012 | Post .................. G06F 11/1048 714/718 |
| 2012/0173797 A1 | 7/2012 | Shen |
| 2013/0054881 A1 | 2/2013 | Ellis et al. |
| 2013/0073822 A1* | 3/2013 | Sandel ............... G06F 11/3433 711/162 |
| 2013/0159601 A1* | 6/2013 | Lassa .................. G11C 29/883 711/103 |
| 2013/0290600 A1 | 10/2013 | Tzafrir |
| 2013/0336059 A1 | 12/2013 | Lee et al. |
| 2014/0040681 A1 | 2/2014 | Wolfman et al. |
| 2014/0164679 A1* | 6/2014 | Manohar ........... G06F 12/0246 711/103 |
| 2016/0062881 A1* | 3/2016 | Chen .................. G06F 12/0246 711/103 |

\* cited by examiner

SYSTEM AND METHOD OF UPDATING METABLOCKS ASSOCIATED WITH MULTIPLE MEMORY DIES

FIELD OF THE DISCLOSURE

The present disclosure is generally related to data storage devices that link physical blocks of memory to form metablocks.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

Non-volatile data storage devices may include multiple memory dies and may group blocks of multiple dies for fast write performance. For example, a logical grouping of blocks may be referred to as a metablock or a superblock. A linking of the group of blocks included in a metablock is generally static, and, as a result, when one block included in the metablock fails, the whole metablock is identified as unusable. Thus, a life of the metablock may be cut short based on failure of a single block. Although a metablock can be "relinked" to replace a failed block with a spare block (if a spare block is available), data recovery and transfer from the failed block to the spare block is resource intensive and time consuming and may result in diminished performance and non-compliance with designated command response times.

SUMMARY

The present disclosure describes one or more techniques for dynamically relinking metablocks (e.g., updating the groups of blocks that form the metablocks) in a data storage device. A data storage device may include a controller coupled to a memory that has multiple memory dies. Each memory die may include multiple blocks of storage elements, and metablocks of the data storage device may be defined as groups of blocks from multiple memory dies.

An erased metablock may be sent to a free metablock pool to be available for a data write operation, and a determination may be made whether there is a large difference between individual blocks of the metablock in terms of block health. When there is a large difference, the metablock may be identified as a relinking candidate, assigned a low write priority, and provided to a relinking pool associated with the free metablock pool. When a number of metablocks included in the relinking pool reaches a threshold number, a relinking process may be performed to update the linkings of the metablocks that are in the relinking pool. For example, blocks with similar health values may be grouped together to generate updated metablocks. After the relinking process, the updated metablocks may be removed from the relinking pool and reused during subsequent memory operations.

DETAILED DESCRIPTION

Particular embodiments of the present disclosure are described with reference to the drawings. In the description, common features are designated by common reference numbers throughout the drawings.

Figure 1:
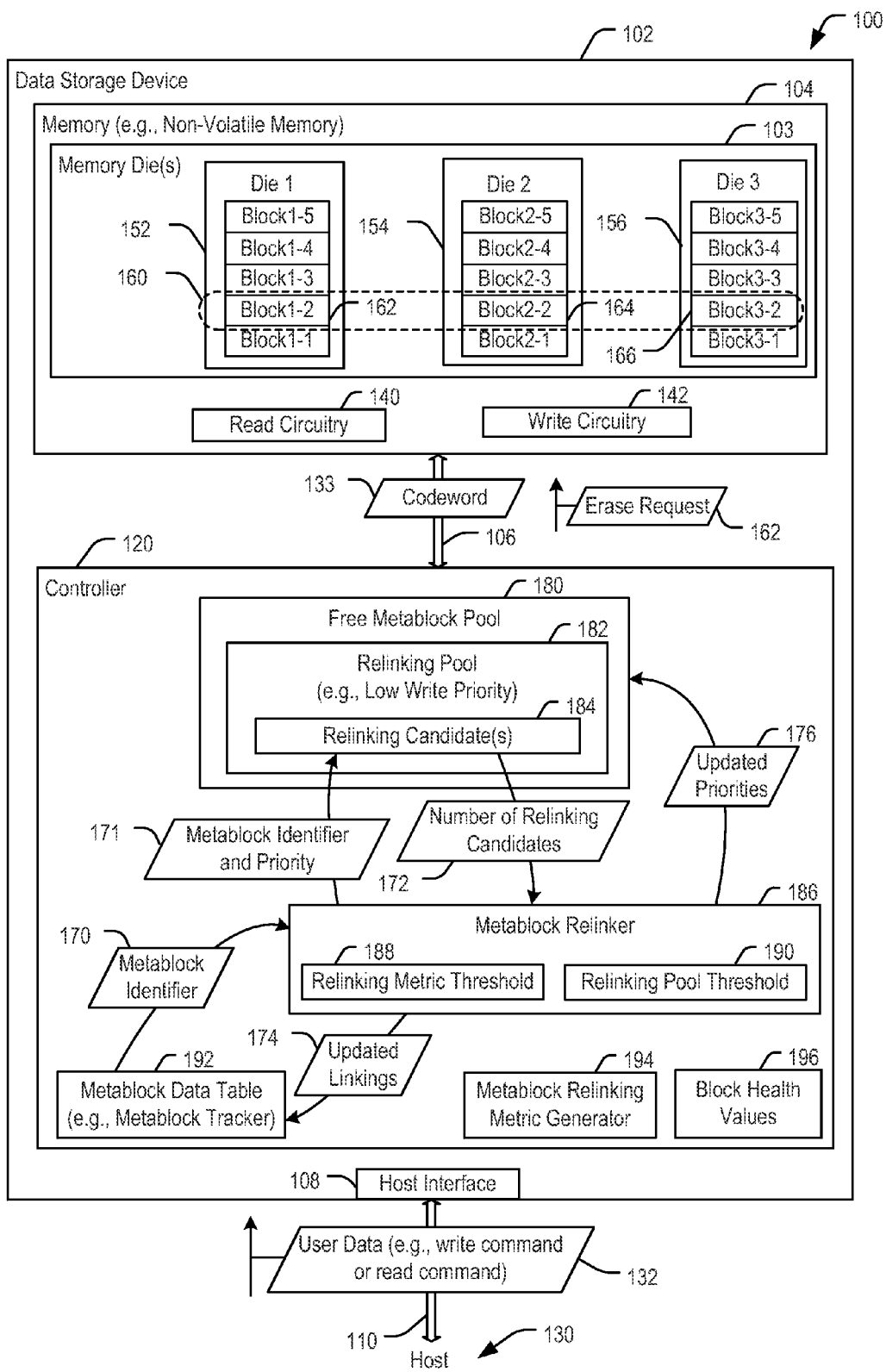
FIG. 1 is a block diagram of a particular illustrative embodiment of a system including a data storage device configured to relink metablocks.

FIG. 1 is a block diagram of a particular illustrative embodiment of a system 100 including a data storage device 102 and a host device 130. The data storage device 102 includes a controller 120 (e.g., a memory controller) coupled to a memory device 104 including multiple memory dies 103. The data storage device 102 is configured to logically link together blocks from the multiple memory dies 103 to define "metablocks" (or "superblocks") as groups of blocks that span the multiple memory dies 103 for read and write operations. The data storage device 102 may identify metablocks that are metablock update candidates—that is, candidates for block relinking, also referred to as "relinking candidates"—and, when a sufficient number of metablocks are identified as relinking candidates, the data storage device 102 may update a linking of the blocks of the identified metablocks to generate updated metablocks. The blocks may be relinked so that the updated metablocks have an average useful life that is longer than the average useful life of the identified metablocks prior to relinking.

The data storage device 102 may be embedded within the host device 130, such as in accordance with an embedded MultiMedia Card (eMMC®) (trademark of Joint Electron Devices Engineering Council (JEDEC) Solid State Technology Association, Arlington, Va.) configuration. Alternatively, the data storage device 102 may be removable from (i.e., "removably" coupled to) the host device 130. For example, the data storage device 102 may be removably coupled to the host device 130 in accordance with a removable universal serial bus (USB) configuration. In some embodiments, the data storage device 102 may include or correspond to a solid state drive (SSD), which may be used as an embedded storage drive, an enterprise storage drive (ESD), or a cloud storage drive (CSD), as illustrative, non-limiting examples.

The data storage device 102 may be configured to be coupled to the host device 130 via a communication path 110, such as a wired communication path and/or a wireless communication path. For example, the data storage device 102 may include an interface 108 (e.g., a host interface) that enables communication (via the communication path 110) between the data storage device 102 and the host device 130, such as when the interface 108 is coupled to the host device 130.

For example, the data storage device 102 may be configured to be coupled to the host device 130 as embedded memory, such as embedded MultiMedia Card (eMMC®) (trademark of JEDEC Solid State Technology Association, Arlington, Virginia) and embedded secure digital (eSD) (Secure Digital (SD®) is a trademark of SD-3C LLC, Wilmington, Del.), as illustrative examples. To illustrate, the data storage device 102 may correspond to an eMMC (embedded MultiMedia Card) device. As another example, the data storage device 102 may correspond to a memory card, such as a Secure Digital (SD®) card, a micro SD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The host device 130 may include a processor and a memory. The memory may be configured to store data and/or instructions that may be executable by the processor. The memory may be a single memory or may include one or more memories, such as one or more non-volatile memories, one or more volatile memories, or a combination thereof. The host device 130 may issue one or more commands to the data storage device 102, such as one or more requests to read data from or write data to the memory 104 of the data storage device 102. For example, the host device 130 may be configured to provide data, such as user data 132, to be stored at the memory 104 or to request data to be read from the memory 104. For example, the user data 132 may have a size that corresponds to a size of a metablock at the data storage device 102 (rather than corresponding to a size of an individual block). The host device 130 may include a mobile telephone, a music player, a video player, a gaming console, an electronic book reader, a personal digital assistant (PDA), a computer, such as a laptop computer or notebook computer, any other electronic device, or any combination thereof. The host device 130 communicates via a memory interface that enables reading from the memory 104 and writing to the memory 104. For example, the host device 130 may operate in compliance with a Joint Electron Devices Engineering Council (JEDEC) industry specification, such as a Universal Flash Storage (UFS) Host Controller Interface specification. As other examples, the host device 130 may operate in compliance with one or more other specifications, such as a Secure Digital (SD) Host Controller specification as an illustrative example. The host device 130 may communicate with the memory 104 in accordance with any other suitable communication protocol.

The data storage device 102 includes the controller 120 coupled to the memory 104 that includes the multiple memory dies 103, illustrated as three memory dies 152-156. The controller 120 may be coupled to the memory dies 103 via a bus 106, an interface (e.g., interface circuitry), another structure, or a combination thereof. For example, the bus 106 may include multiple distinct channels to enable the controller 120 to communicate with each of the memory dies 103 in parallel with, and independently of, communication with the other memory dies 103.

Each of the memory dies 152-156 includes multiple blocks, illustrated as five blocks per die. For example, the first memory die 152 is illustrated as having five blocks (block 1-1 to block 1-5). However, each of the memory dies 152-156 may have more than five blocks (or fewer than five blocks). Each block may include multiple word lines, and each word line may include (e.g., may be coupled to) multiple storage elements. For example, each storage element may be configured as a single-level cell (SLC, storing one bit per storage element) or a multi-level cell (MLC, storing multiple bits per storage element). In some implementations, each block is an erase unit and data is erasable from the memory 104 according to a block-by-block granularity. One or more of the memory dies 152-156 may include a two dimensional (2D) memory configuration or a three dimensional (3D) memory configuration. The memory 104 may store data, such as the user data 132 or encoded user data, such as a codeword 133, as described further herein.

The memory 104 may include support circuitry associated with the memory 104. For example, the memory 104 may be associated with circuitry to support operation of the storage elements of the memory dies 152-156, such as read circuitry 140 and write circuitry 142. Although depicted as separate components, the read circuitry 140 and the write circuitry 142 may be combined into a single component (e.g., hardware and/or software) of the memory 104. Although the read circuitry 140 and the write circuitry 142 are depicted as external to the memory dies 103, each of the individual memory dies 152-156 may include read and write circuitry that is operable to read and/or write from the individual memory die independent of any other read and/or write operations at any of the other memory dies 152-156.

The controller 120 is configured to receive data and instructions from and to send data to the host device 130 while the data storage device 102 is operatively coupled to the host device 130. The controller 120 is further configured to send data and commands to the memory 104 and to receive data from the memory 104. For example, the controller 120 is configured to send data and a write command to instruct the memory 104 to store the data to a specified metablock. For example, the controller 120 may be configured to send a first portion of write data and a first physical address (of a first block of the metablock, e.g., block 1-3) to the first memory die 152, a second portion of the write data and a second physical address (of a second block of the metablock. e.g., block 2-3) to the second memory die 154, and a third portion of the write data and a third physical address (of a third block of the metablock, e.g., block 3-3) to the third memory die 156. The controller 120 may be configured to send a read request to the memory 104 to read the first portion from the first physical address in the first memory die 152, to read the second portion from the second physical address in the second memory die 154, and to read the third portion from the third physical address in the third memory die 156.

The controller 120 includes a metablock data table 192, a free metablock pool 180, a metablock relinker 186, and a metablock relinking metric generator 194. The metablock data table 192 may correspond to a data structure that tracks metablocks and the blocks that form the metablocks. For example, the controller 120 may define a metablock as a first block from the first memory die 152, a second block from the second memory die 154, and a third block from the third memory die 156. The controller 120 may populate an entry in the metablock data table 192 that associates a metablock identifier with the selected blocks from the memory dies 152-156 that form the metablock, forming a metablock through linking of the selected blocks from the multiple memory dies 152-156. The metablock data table 162 may also include additional information, such as block health values, metablock relinking metrics, one or more other types of data, or a combination thereof.

The free metablock pool 180 may be a data structure, such as a prioritized list or table of identifiers of metablocks that are available for storing data. For example, a metablock may be erased by erasing each of the individual blocks that form the metablock, such as via an erase request 162. To illustrate, a metablock may be erased responsive to a command from the host device 130 or based on an internal process at the data storage device 102, such as a garbage collection operation that copies valid data from multiple metablocks into a single metablock and flags the multiple metablocks to be erased (e.g., to be erased as part of a background operation). After a metablock is erased, the metablock may be "added" to the free metablock pool 180 by adding an identifier of the erased metablock to the free metablock pool 180. Although metablocks are described herein as being "added to" the free metablock pool 180, "in" the free metablock pool 180, or "removed from" the free metablock pool 180 for ease of explanation, it should be understood that metablock identifiers or other indications of the metablocks are added to, stored in, or removed from the free metablock pool 180.

A write priority may be assigned to or otherwise determined for the metablocks in the free metablock pool 180. Metablocks in the free metablock pool 180 having a higher write priority may be selected for write operations before selection of metablocks in the free metablock pool 180 having a lower write priority. For example, metablocks formed of blocks exhibiting better block "health" (e.g., fewer data errors or having a smaller count of program/erase cycles) may be assigned a higher write priority than metablocks formed of blocks exhibiting lesser health (e.g., having more data errors or having a larger count of program/erase cycles). When a metablock in the free metablock pool 180 is selected for a data write operation, the metablock may be removed from the free metablock pool 180.

Metablocks in the free metablock pool 180 that are identified as candidates for relinking (e.g., as a relinking candidate 184) may be added to a relinking pool 182. The relinking pool 182 may include a data structure that includes identifiers of relinking candidates. Metablocks added to the relinking pool 182 may be assigned a low write priority to delay selection of the metablocks for write operations and to enable accumulation of a sufficient number of relinking candidates 184 in the relinking pool 182 to begin a relinking operation at the metablock relinker 186. Alternatively, metablocks added to the relinking pool 182 may be prevented from selection for write operations until after relinking has been performed.

Although the relinking pool 182 is described as a data structure within the free metablock pool 180, in other implementations the relinking pool 182 may correspond to a data structure that is separate from the free metablock pool 180. In other implementations, the relinking pool 182 may not correspond to a dedicated data structure and may instead correspond to a logical grouping of metablocks in the free metablock pool 180 that have been assigned the low write priority. For example, a lowest write priority (or a dedicated write priority value) may be assigned to the identified relinking candidate(s) 184, and the relinking pool 182 may correspond to all metablocks in the free metablock pool 180 having the lowest write priority (or the dedicated write priority value).

The metablock relinker 186 is configured to determine whether a metablock added to the free metablock pool 180 is a relinking candidate 184. A metablock may be identified as a relinking candidate based on an amount of variation in the health of the blocks that form the metablock. For example, block health values 196 may be determined for each block of the metablock to indicate a relative health of the block. For example, a block health value may be determined based on a bit error rate, a number of program/erase (P/E) cycles, time to complete an erase operation, time to complete a programming operation, one or more other factors associated with the block, or any combination thereof.

To illustrate, a bit error rate may be determined during one or more data read operations from the block (e.g., by an error correction coding (ECC) decoder of the data storage device 102), with a higher error rate corresponding to lower health. A count of P/E cycles may be maintained by the data storage device 102 (e.g., such as for use with wear leveling), with higher count of P/E cycles corresponding to lower health. A time to complete an erase operation may correspond to a measured duration between initiating an erase operation and completing the erase operation. As another example, the time to complete the erase operation may correspond to a count of erase pulses applied during the erase operation (such as modified by a magnitude of an erase voltage applied during the erase pulses), with a longer time corresponding to lower health. A time to complete a programming operation may correspond to a measured duration between initiating a programming operation and completing the programming operation. As another example, the time to complete the programming operation may correspond to a count of programming pulses applied during the programming operation (such as modified by a magnitude of a programming voltage applied during the programming pulses), with a longer time corresponding to lower health.

A useful life of a metablock may be limited by the shortest useful life of its blocks, which may be predicted using the block health values 196. The metablocks' average useful life may be maximized when all of the blocks of each particular metablock reach the end of their respective useful lives at the same time. The metablock relinking metric generator 194 may be configured to determine a value of a metablock relinking metric for a metablock based on a difference of the block health values of its component blocks. For example, the metablock relinking metric generator 194 may determine the metablock relinking metric by identifying the highest block health value of a component block of a metablock, identifying the lowest block health value of a component block of the metablock, and assigning the metablock relinking metric as a computed difference between the highest block health value and the lowest block health value.

The metablock relinker 186 may be configured to determine whether a metablock is a relinking candidate 184 based on a value of the metablock relinking metric for the metablock. For example, the metablock relinker 186 may be configured to receive the metablock relinking metric and to identify the metablock as a relinking candidate 184 in response to the metablock relinking metric satisfying a relinking metric threshold 188. In some implementations, the metablock relinking metric satisfies the relinking metric threshold 188 when the metablock relinking metric equals or exceeds the relinking metric threshold 188. In other implementations, the metablock relinking metric satisfies the relinking metric threshold 188 when the metablock relinking metric exceeds the relinking metric threshold 188.

The metablock relinker 186 may be configured to determine when a sufficient number of the relinking candidates 184 have been identified to perform a relinking operation to the relinking candidates 184. For example, the metablock relinker 186 may be configured to receive or to otherwise determine a number of relinking candidates 172 that are in the relinking pool 182. The metablock relinker 186 may be configured to initiate a relinking operation in response to the number of relinking candidates 172 satisfying a relinking pool threshold 190. In some implementations, the number of relinking candidates 172 satisfies the relinking pool threshold 190 when the number of relinking candidates 172 equals or exceeds the relinking pool threshold 190. In other implementations, the number of relinking candidates 172 satisfies the relinking pool threshold 190 when the number of relinking candidates 172 exceeds the relinking pool threshold 190.

In response to determining that a sufficient number of the relinking candidates 184 have been identified, the metablock relinker 186 may be configured to perform a relinking operation on blocks that form the relinking candidates 184. As described further below with reference to FIG. 2, the relinking operation may determine updated groupings of the blocks based on block health values 196. For example, the metablock relinker 186 may be configured to access the block health values 196 corresponding to the blocks of the relinking candidates 184 and to sort the blocks in order of block health value for each memory die 152-156. The metablock relinker 186 may generate updated metablocks by re-grouping the sorted blocks according to the sort order. For example, a first updated metablock may be formed by grouping the first block in the sort order for the first die 152, the first block in the sort order for the second die 154, and the first block in the sort order for the third die 156. A second updated metablock may be formed by grouping the second block in the sort order for the first die 152, the second block in the sort order for the second die 154, and the second block in the sort order for the third die 156. In this manner, the metablock relinker 188 may generate the updated metablocks by relinking blocks from the relinking candidates 184.

During operation, the controller 120 may perform an erase operation to erase the blocks that form a particular metablock, such as a representative metablock 160 formed of a first block (block 1-2) 162 in the first memory die 152, a second block (block 2-2) 164 in the second memory die 154, and a third block (block 3-2) 166 in the third memory die 156. A metablock identifier 170 of the erased metablock 160 (e.g., metablock "2") may be provided to the metablock relinker 186. The block health values 196 corresponding to the blocks 162-166 of the erased metablock 160 may be updated, such as based on a time to complete the erase operation at each of the blocks 162-166 or based on a number of errors detected in data most recently read from each of the blocks 162-166 (e.g., when copying data during a garbage collection operation).

The metablock relinking metric generator 194 may generate a metablock relinking metric for the erased metablock 160. For example, the metablock relinking metric generator 194 may subtract the lowest block health value of the blocks 162-166 from the highest block health value of the blocks 162-166. The difference between the lowest and highest of the block heath values of the block 162-166 may be provided to the metablock relinker 186 as the metablock relinking metric.

The metablock relinker 186 may compare the metablock relinking metric to the relinking metric threshold 188. In response to the metablock relinking metric satisfying the relinking metric threshold 188 (e.g., equaling or exceeding the relinking metric threshold 188), the metablock relinker 186 may determine a low write priority for the metablock 160, designating the metablock 160 as a relinking candidate for the relinking pool 182. Otherwise, in response to the metablock relinking metric not satisfying the relinking metric threshold 188, the metablock relinker 186 may determine a higher write priority for the metablock 160. For example, in an implementation using two write priority values (e.g., "low" and "high"), all metablocks other than the relinking candidates 184 may be assigned the "high" write priority. In other implementations, the write priority may be at least partially based on block health values. For example, the write priority may be based on an average of the block health values of the blocks of a metablock so that metablocks with better average health have a higher write priority than metablocks with lower average health. Data including a metablock identifier and write priority 171 for the metablock 160 may be provided to the free metablock pool 180.

In response to the number of relinking candidates 172 satisfying the relinking pool threshold 190, the metablock relinker 186 may relink the blocks of the relinking candidates 184 based on the block health values 196, as described above. The metablock relinker 186 may provide updated linkings 174 to the metablock data table 192 to indicate the updated metablocks resulting from the relinking operation. Updated write priorities 176 may be provided to the free metablock pool 180 to indicate a higher write priority for the updated metablocks that are removed from the relinking pool 182.

Operation of the metablock relinker 186 may be adjusted over the life of the data storage device 102 by adjusting values of one or both of the thresholds 188, 190, such as may be determined by the controller 120 or the host device 130. For example, early in the life of the data storage device 102, the thresholds 188, 190 may have relatively large values to reduce an impact of relinking operations on device performance. As the data storage device 102 approaches a predicted end of its useful life, one or both of the thresholds 188, 190 may be decreased to more tightly group the blocks by health value and to increase a frequency of performing relinking operations to further extend the average useful life of the metablocks.

By relinking the metablocks in the relinking pool 182 without also relinking the metablocks in the free metablock pool 180 that are not relinking candidates, the data storage device 102 is able to improve average metablock useful life while avoiding a delay and computational complexity associated with relinking all of the metablocks in the free metablock pool 182. Metablocks selected to undergo a relinking operation may be limited to the metablocks that satisfy the relinking metric threshold 188 (e.g., by having a relatively large variance in block health) and that therefore are more likely to provide greater improvement of average useful life as a result of relinking as compared to metablocks that do not satisfy the relinking metric threshold 188 (e.g., by having a relatively low variance in block health).

Figure 2:
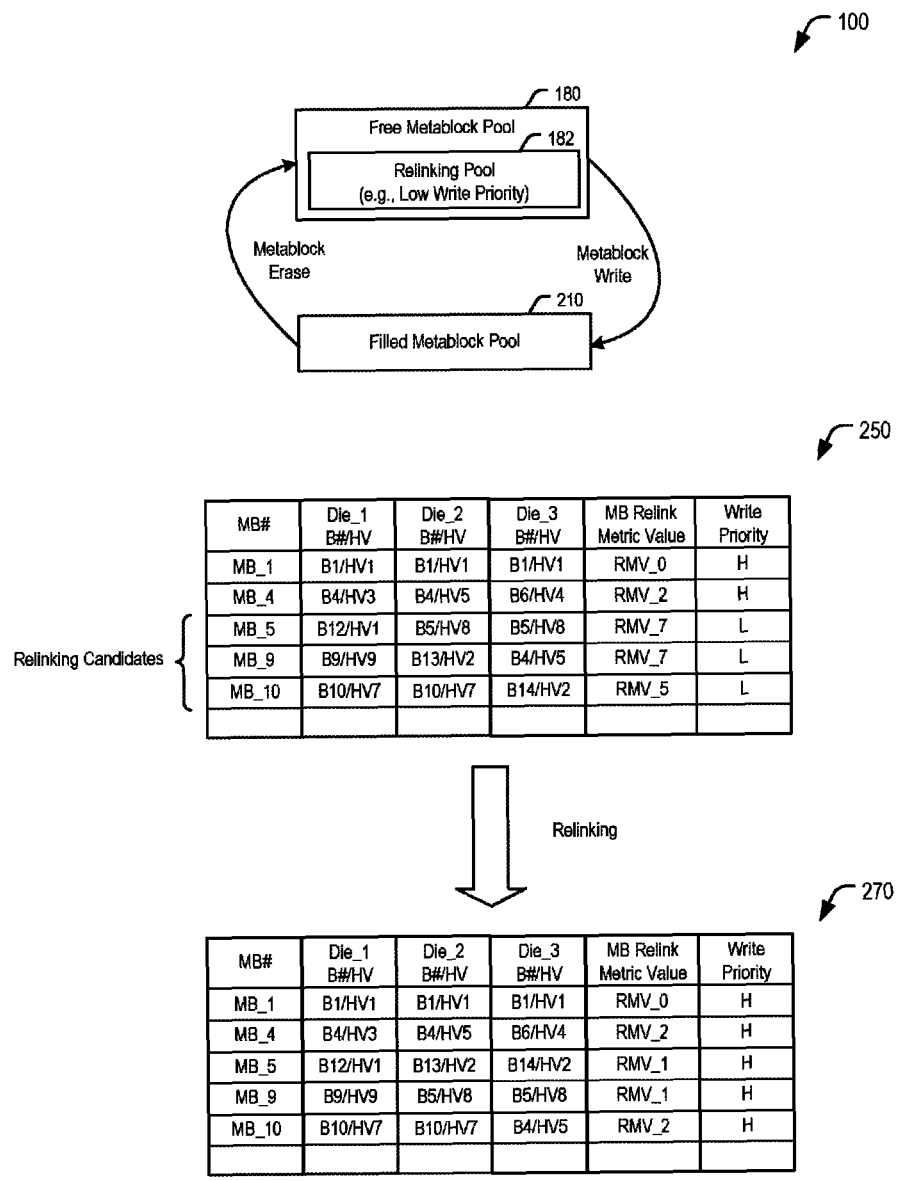
FIG. 2 is a diagram to illustrate an illustrative example of a process of relinking metablocks.

Referring to FIG. 2, a graphical representation 200 illustrates an example of operation of the data storage device 102 of FIG. 1. An erased metablock in the free metablock pool 180 may be selected for a data write operation and provided to a filled metablock pool 210. Upon erasing of the metablock (e.g., in response to an erase instruction from the host device 130 or during a housekeeping operation in the data storage device 102), the metablock may be returned to the free metablock pool 180. Erased metablocks identified as relinking candidates may be provided to the relinking pool 182.

A table 250 illustrates an example of contents of the free metablock pool 180. The table 250 indicates, for each metablock in the free metablock pool 180, a metablock identifier (MB#), a block number (B#) and health value (HV) for a component block in the first memory die 152 (Die _1), a block number (B#) and health value (HV) for a component block in the second die 154 (Die_2), and a block number (B#) and health value (HV) for a component block in the third die 156 (Die_3). The table 250 also includes a value of the metablock relinking metric value (RMV) and a write priority for each of the metablocks in the free metablock pool 180.

As illustrated, the free metablock pool 180 includes five metablocks: metablock 1 (MB_1), metablock 4 (MB_4), metablock 5 (MB_5), metablock 9 (MB_9), and metablock 10 (MB_10). Metablock 1 (MB_1) includes block 1 from die 1, block 1 from die 2, and block 1 from die 3. Each of the blocks has a block health value of "1", which may indicate a relatively high (or highest) block health value. Because a variation of the block health values is zero, the metablock relinking metric has a value of "0" (RMV_0) and a high write priority (H).

Metablock 4 includes block 4 from die 1 with health value "3," block 4 from die 2 with health value "5," and block 6 from die 3 with health value "4." The metablock relinking metric has a value of "2" (i.e., 5 (from die 2)−3 (from die 1)=2). Because the metablock relinking metric does not satisfy a relinking threshold (e.g., the relinking metric of 2 does not exceed a relinking threshold of 4), metablock 4 has a high write priority (H).

Metablock 5 includes block 12 from die 1 with health value "1," block 5 from die 2 with health value "8," and block 5 from die 3 with health value "8." The metablock relinking metric has a value of "7." Because the metablock relinking metric satisfies the relinking threshold (e.g., the relinking metric of 7 equals or exceeds the relinking threshold of 4), metablock 5 is identified as a relinking candidate and has a low write priority (L).

Metablock 9 includes block 9 from die 1 with health value "9" (e.g., indicating a relatively low, or lowest, block health value), block 13 from die 2 with health value "2," and block 4 from die 3 with health value "5." The metablock relinking metric has a value of "7." Because the metablock relinking metric satisfies the relinking threshold (e.g., the relinking metric of 7 equals or exceeds the relinking threshold of 4), metablock 9 is identified as a relinking candidate and has a low write priority.

Metablock 10 includes block 10 from die 1 with health value "7," block 10 from die 2 with health value "7," and block 14 from die 3 with health value "2." The metablock relinking metric has a value of "5" and metablock 10 is identified as a relinking candidate having a low write priority.

A relinking operation may be initiated when the number of relinking candidates (e.g., three in table 250) satisfies a relinking pool threshold (e.g., 3). The relinking operation may include sorting the relinking candidate blocks of die 1 of the relinking candidates in order of block health value, such as to generate a first sorted list (from highest to lowest) of block 12, block 10, and block 9. The relinking candidate blocks of die 2 may be sorted to generate a second sorted list of block 13, block 10, and block 5. The relinking candidate blocks of die 3 may be sorted to generate a third sorted list of block 14, block 4, and block 5.

Relinking may be performed based on the sort order of the sorted lists. For example, metablock 5 may be relinked to include the first block in the sort order of each of the sorted lists: block 12 of die 1 (HV=1), block 13 of die 2 (HV=2), and block 14 of die 3 (HV=2), resulting in a metablock relinking metric value of "1". Metablock 10 may be relinked to include the second block in the sort order of each of the sorted lists: block 10 of die 1 (HV=7), block 10 of the second die (HV=7), and block 4 of the third die (HV=5), resulting in a metablock relinking metric value of "2." Metablock 9 may be relinked to include the third block in the sort order of each of the sorted lists: block 9 of die 1 (HV=9), block 5 of the second die HV=8), and block 5 of the third die (HV=8), resulting in a metablock relinking metric value of "1."

Results of the relinking operation including the updated metablocks 5, 9, and 10 are shown in table 270. Because no metablock in the free metablock pool 180 has a metablock relinking metric that satisfies the relinking metric threshold, no relinking candidates remain, the relinking pool 182 is empty, and all metablocks in the free metablock pool 180 are assigned a high write priority.

Prior to the relinking operation, metablocks 5, 9, and 10 may be expected to have a useful life limited by one or two blocks of relatively poor block health. For example, the useful life of metablock 9 may be expected to end when block 9 on die 1 fails (HV=9), even though the blocks on die 2 and die 3 may have good block health and may otherwise be continue to be usable. The useful life of metablock 5 may be expected to end at approximately the same time as metablock 9, when block 5 on die 2 or block 5 on die 3 fails (HV=8), even though the block on die 1 may have good block health and may be continue to be usable. After the relinking operation, the useful life of metablock 9 may still be limited by block 9 on die 1 (HV=9), but the useful life of metablock 5 may be extended significantly by the replacement of blocks with blocks having relatively good block health (HV=2). As a result, an average useful life of the metablocks may be extended.

Although FIGS. 1-2 illustrate the memory 104 as including three memory dies 152-156, in other implementations the non-volatile memory may include two memory dies or more than three memory dies. Although metablocks are described as including a single block from each of the memory dies of the memory 104, in other implementations a metablock may include multiple blocks from one or more of the memory dies, may exclude blocks from one of more of the memory dies, or a combination thereof. For example, one or more of the memory dies 103 may include multiple planes of storage elements, each plane being accessible and erasable independently of the other plane(s), and a metablock may include blocks from multiple planes on the same memory die.

Figure 3:
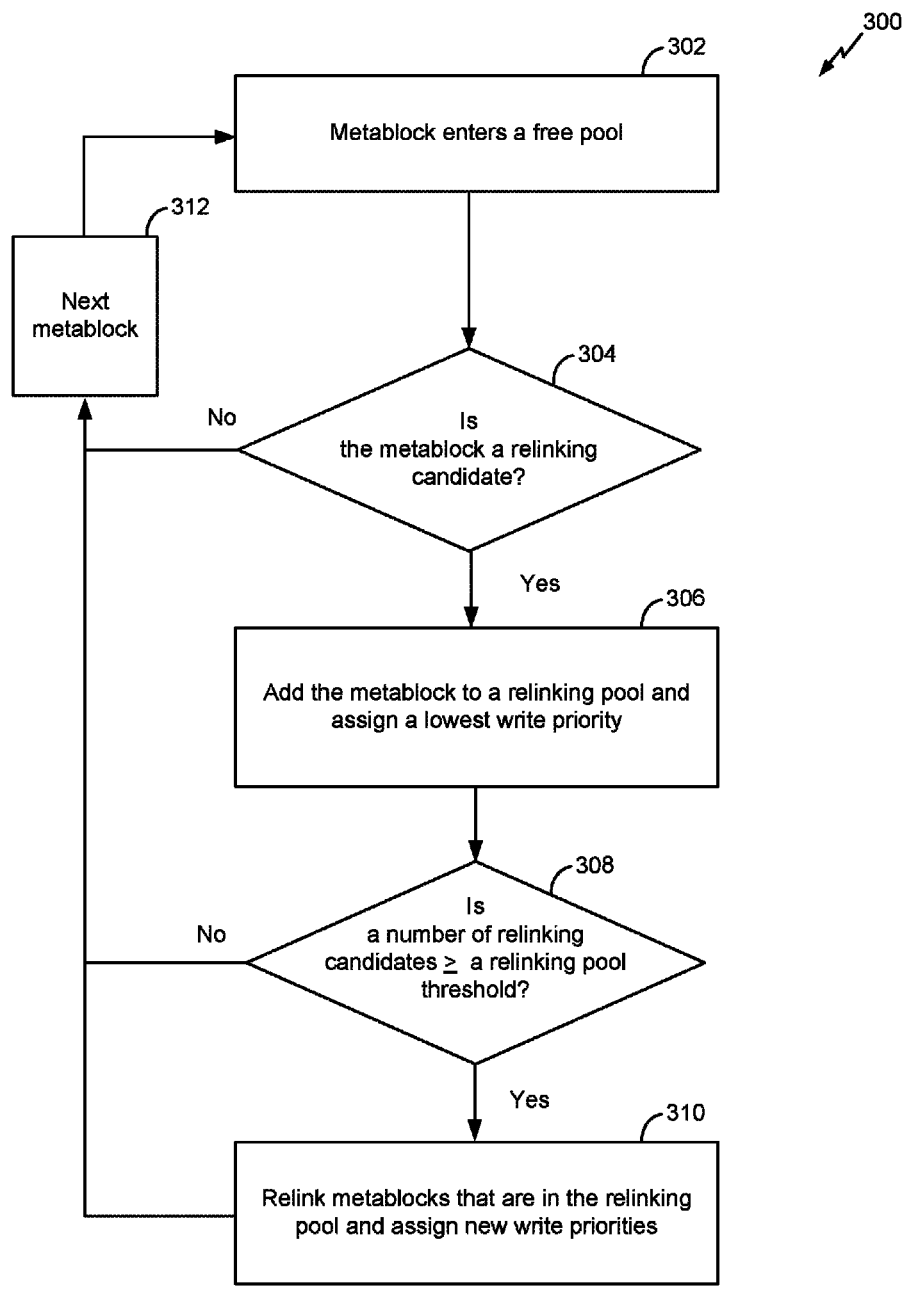
FIG. 3 is a flow diagram of a first illustrative embodiment of a method to relink metablocks.

Referring to FIG. 3, a first illustrative embodiment of a method 300 to relink metablocks associated with a data storage device is shown. The data storage device may include or memory having multiple memory dies, such has the memory 104 having the multiple dies 103 of FIG. 1. Each memory die of the multiple memory dies may include multiple blocks of storage elements and metablocks may be defined in the data storage device as groups of blocks from the multiple memory dies. For example, the method 300 may be performed by the controller 120 (e.g., the metablock relinker 186) or the memory 104 of the data storage device 102, or by the host device 130 of FIG. 1.

The method 300 may include receiving a metablock at a free pool, at 302. For example, the free pool may include or correspond to the free metablock pool 180 of FIG. 1.

The method 300 may also include determining whether the metablock is a relinking candidate, at 304. The metablock may be associated with (e.g., correspond to) a metablock relinking metric. To determine whether the metablock is a relinking candidate, the metablock relinking metric may be compared to a relinking metric threshold. The metablock may be identified as a relinking candidate when the metablock relinking metric satisfies the relinking metric threshold. When the metablock is not a relinking candidate, the method 300 advances to identify a next metablock, at 312. The next metablock may be a free metablock to be added to the free pool. When the metablock is a relinking candidate, the method 300 advances to 306.

The metablock is added to the relinking pool and assigned a lowest write priority, at 306. The relinking pool may include or correspond to the relinking pool 182 of FIG. 1. The relinking pool may be associated with (e.g., included in)

the free pool. In some embodiments, the relinking pool may include a designated portion of the free pool. In other embodiments, the relinking pool may correspond to one or more entries of the free pool that have a lowest priority.

The method 300 may further include determining whether a number of relinking candidates matches or exceeds a relinking pool threshold, at 308. The number of relinking candidates may be determined and compared to the relinking pool threshold. For example, the number of relinking candidates 172 may be compared to the relinking pool threshold 190 of FIG. 1. When the number of relinking candidates does not match and/or does not exceed the relinking pool threshold, the method 300 advances to identify the next metablock, at 312. When the number of relinking candidates matches or exceeds the relinking pool threshold, the method 300 advances to 310.

Metablocks that are in the relinking pool are relinked and assigned new write priorities, at 310. By relinking the metablocks, one or more of the relinked metablocks may be removed from the relinking pool. For example, the one or more relinked metablocks may be removed from the relinking pool and each of the one or more relinked metablocks may be assigned a higher priority. After performing the relinking operation, the method 300 advances to identify the next metablock, at 312.

Thus, metablocks identified as relinking candidates may be relinked (e.g., re-grouped) and may result in similar quality blocks being grouped together. During relinking of metablocks identified as relinking candidates, metablocks included in the free pool and not in the relinking pool may be available to be selected for write operations. Accordingly, relinking of the metablocks in the relinking pool does not prohibit selection of metablocks that are included in the free pool and not in the relinking pool.

Figure 4:
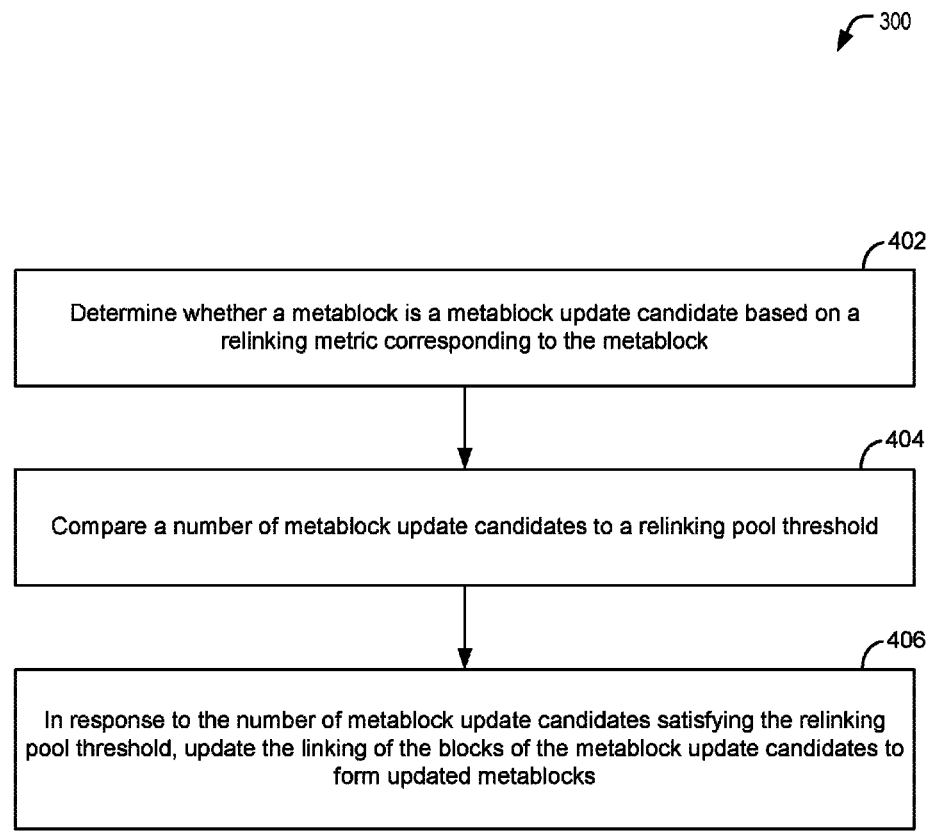
FIG. 4 is a flow diagram of a second illustrative embodiment of a method to relink metablocks.

Referring to FIG. 4, a second illustrative embodiment of a method 400 to relink blocks to form updated metablocks associated with a data storage device is shown. The data storage device may include or correspond to the data storage device 102 of FIG. 1. The data storage device may include memory having multiple memory dies, such has the memory 104 having the multiple dies 103 of FIG. 1. Each memory die of the multiple memory dies may include multiple blocks of storage elements and metablocks may be formed in the data storage device through linking of blocks from the multiple memory dies. For example, the method 400 may be performed by the controller 120 (e.g., the metablock relinker 186) or the memory 104 of the data storage device 102, or by the host device 130 of FIG. 1.

The method 400 includes determining whether a metablock is a metablock update candidate (e.g., a relinking candidate 184 of FIG. 1) based on a relinking metric corresponding to the metablock, at 402. For example, one or more metablocks may be determined to be metablock update candidates based on relinking metrics corresponding to the one or more metablocks, such as upon adding the metablocks to the free metablock pool 180 of FIG. 1. A value of the relinking metric for a metablock may be determined based on a difference in block health values of the blocks forming the metablock, such as a difference between a largest block health value and a smallest block health value of the blocks forming the metablock. For example, the block health value of each of the blocks may be determined based on a bit error rate, a count of program/erase cycles, a time to complete an erase operation, a time to complete a data program operation, or any combination thereof. The metablock may be determined to be a metablock update candidate based on a comparison of the relinking metric to a relinking metric threshold, such as the relinking metric threshold 188 of FIG. 1.

When the metablock is determined to be a metablock update candidate, the metablock (e.g., the metablock identifier) may be added to the relinking pool of a free metablock pool. To illustrate, the metablock update candidate may be added to the relinking pool 182 of the free metablock pool 180 of FIG. 1. The metablock that is added to the relinking pool may be assigned a lowest possible write priority associated with the free metablock pool. For example, in response to determining that the metablock is a metablock update candidate, a write priority of the metablock may be assigned a value indicating a low write priority. When the metablock is determined to not be a metablock update candidate, the metablock (e.g., the metablock identifier) may be added to the free metablock pool, but may not be included in the relinking pool. The metablock that is added to the free pool and not included in the relinking pool may be assigned a write priority other than the lowest possible write priority associated with the free metablock pool.

The method 400 also includes comparing a number of the metablock update candidates to a relinking pool threshold, at 404. For example, the number of the metablock update candidates and the relinking pool threshold may include or correspond to the number of relinking candidates 172 and the relinking pool threshold 190 of FIG. 1, respectively.

The method 400 further includes, in response to the number of the metablock update candidates satisfying the relinking pool threshold, updating the linking of the blocks of the metablock update candidates to form updated metablocks, at 406. For example, updated linkings may be generated for multiple metablock update candidates included in the relinking pool. The number of metablock update candidates may satisfy the relinking pool threshold when the number of metablock update candidates matches or exceeds the relinking pool threshold. Updating the linking of the blocks of the metablock update candidates may be performed by grouping the blocks according to block health value such that an average useful life of the updated metablocks exceeds an average useful life of the metablock update candidates.

The linkings of the blocks may be updated by changing data within a field of a metablock data table, such as the metablock data table 192 of FIG. 1 or a field of the table 250 of FIG. 2. The updated linkings, such as the updated linkings 174 of FIG. 1, may be provided to and recorded in the metablock data table (e.g., the metablock data table 192 of FIG. 1), that tracks which group of blocks from the multiple memory dies is included in (e.g., define) a corresponding metablock. Based on the updated linking of the blocks of the metablock update candidates, one or more write priorities associated with the metablock update candidates may be updated (e.g., reassigned). For example, one or more of the updated metablocks may be assigned a write priority other than the lowest possible write priority associated with the free metablock pool such that the one or more updated metablocks are not included in the relinking pool.

Thus, metablocks identified as metablock update candidates may be relinked (e.g., re-grouped), which may result in similar quality blocks being grouped together. By grouping similar quality blocks together, a life of one or more of the updated metablocks may be extended and an average useful life of the metablocks in the data storage device may be improved.

The method 300 of FIG. 3 and/or the method 400 of FIG. 4 may be initiated or controlled by an application-specific integrated circuit (ASIC), a processing unit, such as a central processing unit (CPU), a digital signal processor (DSP), a controller, another hardware device, a firmware device, a field-programmable gate array (FPGA) device, or any combination thereof As an example, the method 300 of FIG. 3 and/or the method 400 of FIG. 4 can be initiated or controlled by one or more processors, such as one or more processors included in or coupled to a controller or a memory of the data storage device 102 and/or the host device 130 of FIG. 1. A controller configured to perform the method 300 of FIG. 3 and/or the method 400 of FIG. 4 may be able to relink metablocks.

Although various components of the data storage device 102 and the host device 130 of FIG. 1 are depicted herein are illustrated as block components and described in general terms, such components may include one or more microprocessors, state machines, or other circuits configured to enable the various components to perform operations described herein. One or more aspects of the various components may be implemented using a microprocessor or microcontroller programmed to perform operations described herein, such as one or more operations of the method 300 of FIG. 3 and/or the method 400 of FIG. 4. In a particular embodiment, the controller 120, the memory 104, and/or the host 130 of FIG. 1 includes a processor executing instructions that are stored at a memory, such as a non-volatile memory of the data storage device 102 or the host device 130. Alternatively or additionally, executable instructions that are executed by the processor may be stored at a separate memory location that is not part of the non-volatile memory, such as at a read-only memory (ROM) of the data storage device 102 or the host device 130 of FIG. 1.

In an illustrative example, the processor may execute the instructions to determine whether a metablock is a metablock update candidate based on a relinking metric corresponding to the metablock. For example, a data structure corresponding to the metablock (e.g., a table entry of a metablock data table) may include a field storing a value of a relinking metric corresponding to the metablock. The relinking metric may be accessed and compared to a relinking metric threshold. In response to the relinking metric equaling or exceeding the relinking metric threshold, the metablock may be determined to be a metablock update candidate.

The processor may also execute instructions to compare a number of metablock update candidates to a relinking pool threshold. For example, a data structure may include a list of entries corresponding to metablocks that are available for write operations, such as the free metablock pool 180 of FIG. 1. Each of the entries may include a field storing an indicator of a write priority of the associated metablock. The data structure may be traversed and the indicator of write priority may be read from each entry and compared to a relinking metric threshold. A counter may initialized and, in response to each instance of an indicator of write priority being detected as equaling or exceeding the relinking metric threshold, the counter may be incremented. A resulting count of the entries having write priorities that equal or exceed the relinking metric threshold (e.g., a counter value after traversing the data structure) may be compared to the relinking pool threshold. As another example, a dedicated data structure, such as the relinking pool 182, may be populated with entries corresponding to metablock update candidates, and the number of metablock update candidates may be determined by accessing a property of the dedicated data structure, such as a size of the dedicated data structure or a number of entries included in the dedicated data structure.

The processor may execute instructions to, in response to the number of metablock update candidates matching or exceeding the relinking pool threshold, update the linking of the blocks of the metablock update candidates to form updated metablocks. For example, a list of blocks may be generated for each of the memory dies. The list of blocks may be populated with entries by traversing a list of blocks of each of the metablock update candidates (e.g., via accessing the block listings in the metablock data table 192) and, for each block of the metablock update candidates, adding an entry to one of the generated lists based on which memory die the block is in. The added entry may indicate a block identifier and a block health value of the block. After populating each of the generated lists, each of the lists may be sorted based on block health value to result in sorted lists. The list of blocks of each of the metablock update candidates may be updated to include blocks having a common index value in each of the sorted lists. For example, blocks having a first index value (e.g., having highest health values occurring in each of the sorted lists) in each of the lists may be assigned to a first of the metablock update candidates. Blocks having a second index value (e.g., having second-highest health values occurring in each of the sorted lists) in each of the lists may be assigned to a second of the metablock update candidates.

Semiconductor memory devices, such as the memory 104 (e.g., the first memory die 152, the second memory die 154, and/or the third memory die 156) of FIG. 1 may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., in a NOR memory array. NAND and NOR memory configurations described have been presented as examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor material, such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements arranged on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material, such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. To illustrate, each of the memory device levels may have a corresponding substrate thinned or removed before stacking the memory device levels to form memory arrays. Because each of the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

In some implementations, the memory 104 (e.g., the first memory die 152, the second memory die 154, and/or the third memory die 156) of FIG. 1 is a non-volatile memory having a three-dimensional (3D) memory configuration that is monolithically formed in one or more physical levels of arrays of memory cells having an active area disposed above a silicon substrate. The active area of a memory cell may be an area of the memory cell that is conductively throttled by a charge trap portion of the memory cell. The data storage device 102 and/or the host device 130 of FIG. 1 may include circuitry, such as read/write circuitry, as an illustrative, non-limiting example, associated with operation of the memory cells.

Associated circuitry is typically used for operation of the memory elements and for communication with the memory elements. As non-limiting examples, memory devices may have circuitry for controlling and driving memory elements to perform functions such as programming and reading. The associated circuitry may be on the same substrate as the memory elements and/or on a separate substrate. For example, a controller for memory read-write operations may be located on a separate controller chip and/or on the same substrate as the memory elements One of skill in the art will recognize that this disclosure is not limited to the two dimensional and three dimensional structures described but cover all relevant memory structures within the spirit and scope of the disclosure as described herein and as understood by one of skill in the art.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
in a data storage device that includes a non-volatile memory having multiple memory dies, wherein each memory die of the multiple memory dies includes multiple blocks of storage elements, and wherein metablocks are formed through linking of blocks from the multiple memory dies, performing:
determining whether one or more of the metablocks are metablock update candidates based on relinking metrics corresponding to the one or more metablocks;
comparing a number of the metablock update candidates to a threshold; and
in response to the number of the metablock update candidates satisfying the threshold, updating the linking of the blocks of the metablock update candidates to form updated metablocks.

2. The method of claim 1, wherein the linking of the blocks of the metablock update candidates is updated by changing data within one or more fields of a metablock data table, the data including identifiers of blocks that are associated with each of the metablock update candidates.

3. The method of claim 1, wherein updating the linking of the blocks of the metablock update candidates is performed by grouping the blocks of the metablock update candidates according to block health value so that an average useful life of the updated metablocks exceeds an average useful life of the metablock update candidates.

4. The method of claim 1, wherein the threshold corresponds to a lowest count of the metablock update candidates that is sufficient to initiate a relinking operation, and wherein the number of the metablock update candidates satisfies the threshold when the number of the metablock update candidates matches or exceeds the threshold.

5. The method of claim 1, further comprising determining a relinking metric value of a first metablock based on a difference between a largest block health value of the blocks forming the first metablock and based on a smallest block health value of the blocks forming the first metablock.

6. The method of claim 5, wherein the block health value of each of the blocks forming the first metablock is determined based on a time to complete an erase operation.

7. The method of claim 1, wherein a first metablock is selected for write operations at least partially based on a write priority of the first metablock, and wherein the method further comprises, in response to determining that the first metablock is a metablock update candidate, assigning a write priority of the first metablock to a value indicating a low write priority.

8. The method of claim 1, wherein determining whether a first metablock is a metablock update candidate is performed upon assignment of the first metablock to a free metablock pool, and further comprising, in response to determining that the first metablock is a metablock update candidate, assigning the first metablock to a relinking pool.

9. The method of claim 1, further comprising determining the number of the metablock update candidates that are available in a relinking pool.

10. The method of claim 1, further comprising:
determining a largest block health value of the blocks forming a first metablock;
determining a smallest block health value of the blocks forming the first metablock;
determining a difference between the largest block health value and the smallest block health value; and
setting a relinking metric value of the first metablock to be equal to the difference.

11. The method of claim 1, further comprising:
prior to determining whether the one or more metablocks are the metablock update candidates, assigning the one or more metablocks to a free metablock pool; and
in response to determining that a first metablock is a metablock update candidate:
assigning the first metablock to a relinking pool; and
assigning a write priority of the first metablock to a value indicating a low write priority.

12. A data storage device comprising:
a non-volatile memory including multiple memory dies, wherein each memory die of the multiple memory dies includes multiple blocks of storage elements; and
a controller coupled to the non-volatile memory, wherein the controller is configured to:
form metablocks through linking of blocks from the multiple memory dies;
determine whether one or more metablocks are metablock update candidates based on relinking metrics corresponding to the one or more metablocks;
compare a number of the metablock update candidates to a threshold; and
in response to the number of the metablock update candidates satisfying the threshold, update the linking of the blocks of the metablock update candidates to form updated metablocks.

13. The data storage device of claim 12, wherein the controller is configured to update the linking of the blocks of the metablock update candidates by changing data within one or more fields of a metablock data table, and wherein the data includes identifiers of blocks that are associated with each of the metablock update candidates.

14. The data storage device of claim 12, wherein the controller is configured to update the linking of the blocks of the metablock update candidates by grouping the blocks of the metablock update candidates according to block health value so that an average useful life of the updated metablocks exceeds an average useful life of the metablock update candidates.

15. The data storage device of claim 12, wherein the threshold corresponds to a lowest count of the metablock update candidates that is sufficient to initiate a relinking operation, and wherein the controller is configured to determine whether the number of the metablock update candidates satisfies the threshold by determining whether the number of the metablock update candidates matches or exceeds the threshold.

16. The data storage device of claim 15, wherein the controller is configured to determine a value of the relinking metric of a first metablock based on a difference between a largest block health value of the blocks forming the first metablock and a smallest block health value of the blocks forming the first metablock, and wherein the controller is configured to determine the block health value of each of the blocks forming the first metablock based on a time to complete an erase operation, a time to complete a data program operation, or a combination thereof.

17. The data storage device of claim 12, wherein the controller is configured to select a first metablock of the one or more metablocks for write operations at least partially based on a write priority of the first metablock, and wherein the controller is configured, in response to determining that the first metablock is a metablock update candidate, to assign a write priority of the first metablock to a value indicating a low write priority.

18. The data storage device of claim 12, wherein the controller is configured to maintain a free metablock pool and to determine whether a first metablock of the one or more metablocks is a metablock update candidate upon assignment of the first metablock to the free metablock pool, wherein the controller is configured, in response to determining that the first metablock is a metablock update candidate, to assign the first metablock to a relinking pool.

19. The data storage device of claim 12, wherein the controller is configured to compare the relinking metric of a first metablock of the one or more metablocks to a relinking metric threshold to determine whether the first metablock is a metablock update candidate.

20. The data storage device of claim 12, wherein the multiple memory dies are coupled in a stacked configuration.

21. The data storage device of claim 12, wherein the non-volatile memory comprises a resistive random access memory (ReRAM).

22. The data storage device of claim 12, wherein the non-volatile memory comprises a flash memory.

23. The data storage device of claim 12, wherein at least one of the multiple memory dies includes a three-dimensional (3D) memory configuration that is monolithically formed in one or more physical levels of arrays of memory cells having an active area disposed above a silicon substrate, and wherein the non-volatile memory includes circuitry associated with operation of the memory cells.

24. A device comprising:
a non-volatile memory including dies that include blocks of storage elements; and
a controller coupled to the non-volatile memory, the controller configured to:
form metablocks through linking of blocks from the dies;
determine a value of a relinking metric of a first metablock based on a difference between a largest block health value of the blocks forming the first metablock and a smallest block health value of the blocks forming the first metablock;
determine one or more metablock update candidates based on multiple relinking metrics;
compare a number of the metablock update candidates to a threshold; and
in response to the number of the metablock update candidates satisfying the threshold, update the linking of the blocks of the metablock update candidates to form updated metablocks.

25. The device of claim 24, wherein the controller is configured to update the linking of the blocks of the metablock update candidates by changing data within one or more fields of a metablock data table, and wherein the data includes identifiers of blocks that are associated with each of the metablock update candidates.

26. The device of claim 24, wherein the controller is configured to update the linking of the blocks of the metablock update candidates by grouping the blocks of the metablock update candidates according to block health value.

27. The device of claim 24, wherein the threshold corresponds to a lowest count of the metablock update candidates that is sufficient to initiate a relinking operation, and wherein the controller is configured to determine whether the number of the metablock update candidates satisfies the threshold by determining whether the number of the metablock update candidates matches or exceeds the threshold.

28. The device of claim 24, wherein at least one of the dies includes a three-dimensional (3D) memory configuration that is monolithically formed in one or more physical levels of arrays of memory cells having an active area disposed above a silicon substrate, and wherein the non-volatile memory includes circuitry associated with operation of the memory cells.

* * * * *